United States Patent
Wu et al.

(10) Patent No.: US 11,667,532 B2
(45) Date of Patent: Jun. 6, 2023

(54) METHOD FOR PRODUCING SILICON CARBIDE FROM WASTE CIRCUIT BOARD CRACKING RESIDUE

(71) Applicants: BEIJING UNIVERSITY OF TECHNOLOGY, Beijing (CN); Guangzhou Institute of Energy Conversion, Chinese Academy of Sciences, Guangzhou (CN)

(72) Inventors: Yufeng Wu, Beijing (CN); Haoran Yuan, Guangzhou (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/843,934

(22) Filed: Jun. 17, 2022

(65) Prior Publication Data

US 2022/0315430 A1 Oct. 6, 2022

Related U.S. Application Data

(63) Continuation of application No. PCT/CN2021/137128, filed on Dec. 10, 2021.

(30) Foreign Application Priority Data

Dec. 11, 2020 (CN) .......................... 202011458206.0

(51) Int. Cl.
    *C01B 32/984* (2017.01)
    *C22B 7/00* (2006.01)
(52) U.S. Cl.
    CPC ............ *C01B 32/984* (2017.08); *C22B 7/005* (2013.01)
(58) Field of Classification Search
    None
    See application file for complete search history.

(56) References Cited

U.S. PATENT DOCUMENTS

2001/0030251 A1* 10/2001 Ueno ...................... C22B 7/001
                                                     241/23
2013/0272947 A1* 10/2013 Qadri ...................... C01B 32/97
                                                     977/896

FOREIGN PATENT DOCUMENTS

CN          1472136 A        2/2004
CN        106882806 A        6/2017
                 (Continued)

OTHER PUBLICATIONS

International Search Report of PCT/CN2021/137128.

*Primary Examiner* — Guinever S Gregorio
(74) *Attorney, Agent, or Firm* — J.C. Patents

(57) ABSTRACT

The invention discloses a method for producing silicon carbide from waste circuit board cracking residue, belongs to the field of comprehensive utilization of waste circuit board cracking products, and particularly relates to a method for high-valued utilization of non-metal components in waste circuit board cracking residue. The method mainly comprises the following steps: rolling and crushing, vibration sorting, ultrafine pulverization and electro-separation, quantitative batching, microwave sintering and discharging and grading. Compared with the prior art, rolling crushing is adopted to replace traditional shearing crushing, microwave sintering is adopted to replace a traditional Acheson smelting furnace, the effects of being easy to operate, saving energy and reducing consumption are achieved, the production efficiency is greatly improved, and the production cost is reduced. A brand-new method for obtaining high-purity silicon carbide by partially replacing anthracite and quartz sand with cracked coke and silicon dioxide in waste circuit board light plates or epoxy resin cracking residues is adopted, and high-value utilization of waste resources is achieved. The method has the characteristics of simple and feasible process, low manufacturing cost and wide adapt- (Continued)

ability, and is beneficial to improving the economic benefit and social benefit of enterprise production.

4 Claims, 1 Drawing Sheet

(56) References Cited

FOREIGN PATENT DOCUMENTS

| | | | |
|---|---|---|---|
| CN | 108160665 A | 6/2018 |
| CN | 109748281 A | 5/2019 |
| CN | 111960420 A | 11/2020 |
| CN | 111977657 A | 11/2020 |
| CN | 112678827 A | 4/2021 |

* cited by examiner

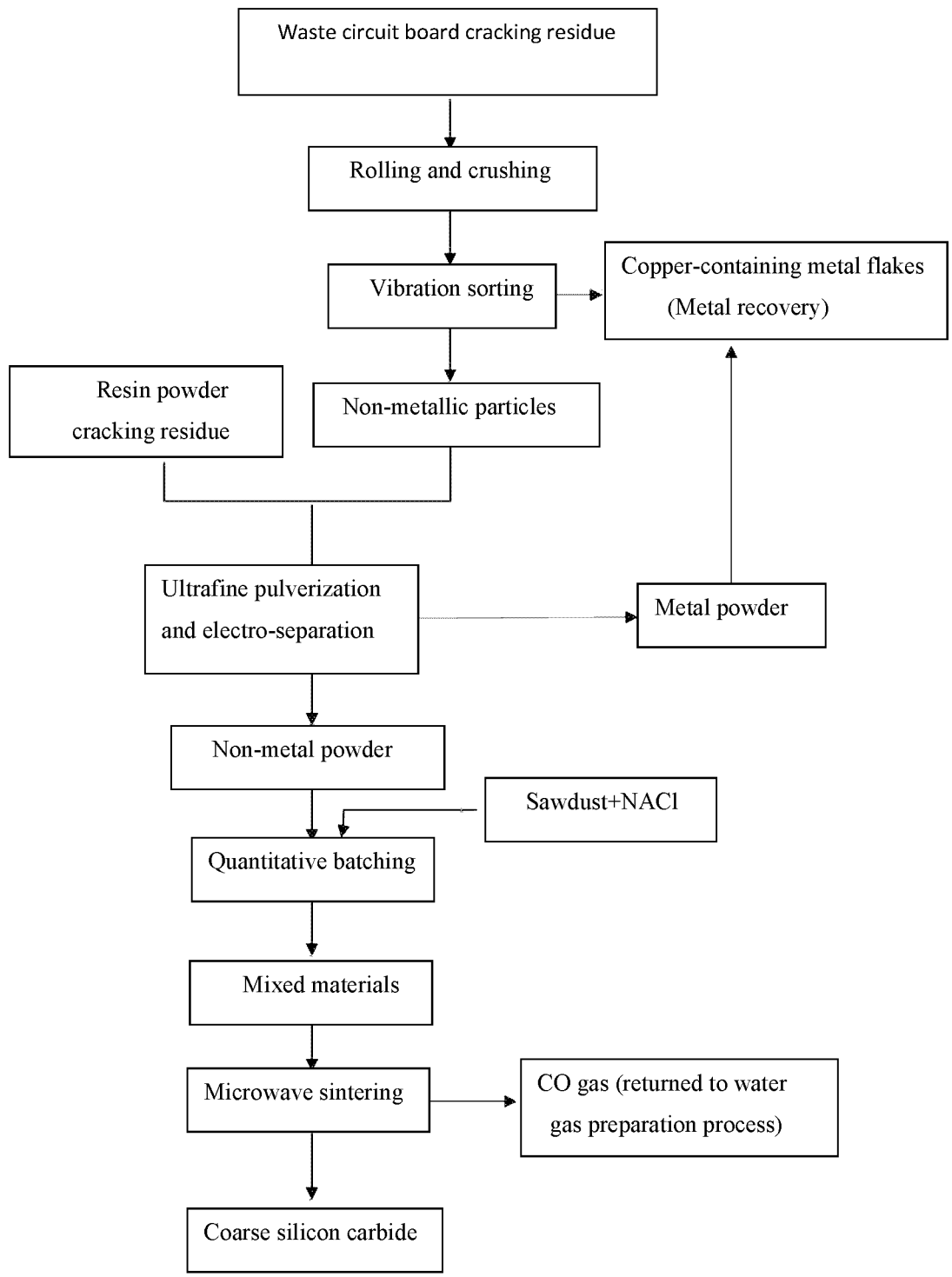

METHOD FOR PRODUCING SILICON CARBIDE FROM WASTE CIRCUIT BOARD CRACKING RESIDUE

CROSS-REFERENCE TO RELATED APPLICATIONS

This application is a continuation of International Application PCT/CN2021/137128 filed on Dec. 10, 2021, which claims the priority benefits to Chinese Patent Application No. 202011458206.0 filed on Dec. 11, 2020, the content of the above identified applications is hereby incorporated by reference in its entirety.

TECHNICAL FIELD

The invention relates to a recovery technology for high-value utilization of waste circuit board cracking residues, in particular to a method for the preparation of silicon carbide from non-metallic components of waste circuit board and epoxy resin cracking residue.

BACKGROUND

Because of its stable chemical properties, high thermal conductivity, small thermal expansion coefficient, and excellent wear resistance, silicon carbide is widely used in abrasives, photovoltaic raw materials, and new ceramic materials, known as "industrial teeth". According to statistics, the use of silicon carbide is the largest in the metallurgical field. In steel production, black silicon carbide with a purity of 90% is often used as an additive. China, Norway, Brazil, Netherlands, Japan and the United States have the largest silicon carbide production in the world. In the production of conventional silicon carbide, the raw materials used are high-purity silica sand and anthracite, and salt is added as an additive. At present, anthracite is widely used as the raw material of silicon carbide in China. Due to the high price of anthracite and limited resources, the production cost of silicon carbide is relatively high. Many manufacturers are actively looking for alternative raw materials in order to reduce production costs without reducing the chemical properties of silicon carbide, so as to solve the contradiction between supply and demand and adjust the structure of Chinese energy industry. The need to find a preparation method of SiC material that can produce low cost and excellent performance is more and more extensive and urgent. Non-metallic components in the cracked residue of waste circuit boards and the residues of epoxy resin powder cracking residue after mechanical sorting of waste circuit boards all have components such as carbon and silicon dioxide required for the preparation of silicon carbide, with extensive resources and low impurity content. It can theoretically be used as an ideal material to replace quartz sand and anthracite to prepare high-value silicon carbide, which saves mineral resources and reduces economic costs. At present, the recycling of waste circuit boards and non-metallic components of epoxy resin powder cracking residue has not received enough attention, and there is no report in the field of silicon carbide production of waste circuit board cracking residue.

SUMMARY

The purpose of the present invention is mainly to solve the problem of high-value utilization of the cracking residue of the waste circuit board, and creatively propose a new method for preparing silicon carbide by using the non-metallic components in the cracked residue of the waste circuit board as the matrix material. The high-value utilization of coke and silica in the non-metallic components of the cracked residue of circuit board has the characteristics of simple and easy process, low manufacturing cost, high resource utilization rate, wide adaptability of raw materials and environmental friendliness, which is conducive to improving the economic and social benefits of enterprises.

The method for producing silicon carbide from waste circuit board cracking residue according to the present invention is carried out in the following steps:

(1) Rolling and crushing: Roll the waste circuit board cracking residue with a particle size of 3-5 cm to obtain crushed materials with a particle size of 0.5-1 mm. The two smooth pressure rollers used in the roller press are of the same size and placed up and down, with 200-300 mm diameter and 300-500 mm width. During the working process, the distance between two rollers is 0.2-0.8 mm, the upper roller moves counterclockwise and the two rollers move in opposite directions with 0.1-0.5 m/s roll surface speed.

(2) Vibration sorting: the material obtained by rolling and crushing in step (1) is vibrated and sieved to obtain copper-containing metal flakes and non-metallic particles.

(3) Ultrafine pulverization and electro-separation: mix non-metallic particles obtained in step (2) with the epoxy resin powder cracking residue in a mass ratio of 5:1-1:1, and an ultrafine pulverizer is used to pulverize the particle size to 0.05-0.2 mm. Then electro-separation is used to obtain non-metal powder and metal powder, the metal powder is mixed with the metal flakes obtained in step (2) enters the metal recovery system.

(4) Quantitative batching: non-metallic powder obtained in step (3) is mixed with the common hardwood sawdust for papermaking, sodium chloride, and water uniformly to obtain a mixed material. Sawdust is convenient for the volatilization of CO gas in sintering process, sodium chloride is convenient for the chlorination of volatile impurities of aluminum, iron and copper, among them, the hardwood sawdust for general papermaking refers to one or more of elm, birch and poplar, sawdust accounted for 2%-5% of the total mass of mixed materials, sodium chloride accounted for 3%-6% and water accounted for 1%-2% of the total mass of mixed materials.

(5) Microwave sintering: put the mixed material obtained in step (4) into an alumina crucible for microwave heating, after a certain period of time, cool the griddle to obtain coarse silicon carbide, and the CO gas generated in the reaction process is returned to the water gas preparation process, wherein the temperature is raised to 1300-1800° C. within 60-90 min, and Insulated for 30-90 min.

Compared with the prior art, the present invention adopts roller crushing instead of traditional shear crushing to pretreat the cracked residue of waste circuit boards, which has the functions of simple operation, energy saving and consumption reduction, and microwave sintering is used instead of traditional Acheson smelting in the implementation process. The furnace shortens the smelting time, reduces the smelting temperature, greatly improves the production efficiency and reduces the production cost.

Since the invention adopts the non-metallic component pyrolysis coke and silica generated in the recovery process of the waste circuit board cracking residue as the matrix material, it can partially replace the primary resources anthracite and quartz sand to produce silicon carbide, save the mineral resources and reduce the economic cost, and no other impurities are introduced in the implementation process, the obtained silicon carbide meets the production quality requirements, fully realizes the high-value utilization of the valuable components of the waste circuit board cracking residue, and has the advantages of simple and easy process, wide adaptability of raw materials, and high resources utilization rate and environmental friendliness.

DESCRIPTION OF DRAWINGS

FIG. 1 shows the process flow diagram of the method for producing silicon carbide from waste circuit board cracking residue

PREFERRED EMBODIMENT

The following embodiments are intended to further illustrate the present invention, rather than limit the present invention.

Embodiment 1

(1) Rolling and crushing: Roll the waste circuit board cracking residue with a particle size of 3 cm. The two smooth pressure rollers used in the roller press are of the same size and placed up and down, with 200 mm diameter and 300 mm width. During the working process, the distance between two rollers is 0.2 mm, the upper roller moves counterclockwise and the two rollers move in opposite directions with 0.5 m/s roll surface speed, crushing material with 0.5 mm particle size is obtained.

(2) Vibration sorting: the material obtained by rolling and crushing in step (1) is vibrated and sieved to obtain copper-containing metal flakes and non-metallic particles.

(3) Ultrafine pulverization and electro-separation: mix non-metallic particles obtained in step (2) with the epoxy resin powder cracking residue in a mass ratio of 2:1, and an ultrafine pulverizer is used to pulverize the particle size to 0.05 mm. Then electro-separation is used to obtain non-metal powder and metal powder, the metal powder is mixed with the metal flakes obtained in step (2) enters the metal recovery system.

(4) Quantitative batching: non-metallic powder obtained in step (3) is mixed with the common sawdust of poplar wood for papermaking, sodium chloride, and water uniformly to obtain a mixed material. Sawdust is convenient for the volatilization of CO gas in sintering process, sodium chloride is convenient for the chlorination of volatile impurities of aluminum, iron and copper, among them, the sawdust of poplar wood for general papermaking accounted for 2% of the total mass of mixed materials, sodium chloride accounted for 3% and water accounted for 1% of the total mass of mixed materials.

(5) Microwave sintering: put the mixed material obtained in step (4) into an alumina crucible for microwave heating, after a certain period of time, cool the griddle to obtain coarse silicon carbide, and the CO gas generated in the reaction process is returned to the water gas preparation process, wherein the temperature is raised to 1300° C. within 60 min, and insulated for 30 min.

The SiC content in the obtained crude silicon carbide is 90%.

Embodiment 2

(1) Rolling and crushing: Roll the waste circuit board cracking residue with a particle size of 5 cm. The two smooth pressure rollers used in the roller press are of the same size and placed up and down, with 300 mm diameter and 500 mm width. During the working process, the distance between two rollers is 0.8 mm, the upper roller moves counterclockwise and the two rollers move in opposite directions with 0.5 m/s roll surface speed, crushing material with 1 mm particle size is obtained.

(2) Vibration sorting: the material obtained by rolling and crushing in step (1) is vibrated and sieved to obtain copper-containing metal flakes and non-metallic particles.

(3) Ultrafine pulverization and electro-separation: mix non-metallic particles obtained in step (2) with the epoxy resin powder cracking residue in a mass ratio of 3:1, and an ultrafine pulverizer is used to pulverize the particle size to 0.2 mm. Then electro-separation is used to obtain non-metal powder and metal powder, the metal powder is mixed with the metal flakes obtained in step (2) enters the metal recovery system.

(4) Quantitative batching: non-metallic powder obtained in step (3) is mixed with the common sawdust of elm wood for papermaking, sodium chloride, and water uniformly to obtain a mixed material. Sawdust is convenient for the volatilization of CO gas in sintering process, sodium chloride is convenient for the chlorination of volatile impurities of aluminum, iron and copper, among them, the sawdust of elm wood for general papermaking accounted for 5% of the total mass of mixed materials, sodium chloride accounted for 6% and water accounted for 2% of the total mass of mixed materials.

(5) Microwave sintering: put the mixed material obtained in step (4) into an alumina crucible for microwave heating, after a certain period of time, cool the griddle to obtain coarse silicon carbide, and the CO gas generated in the reaction process is returned to the water gas preparation process, wherein the temperature is raised to 1800° C. within 90 min, and insulated for 90 min.

The SiC content in the obtained crude silicon carbide is 95%.

Embodiment 3

(1) Rolling and crushing: Roll the waste circuit board cracking residue with a particle size of 4 cm. The two smooth pressure rollers used in the roller press are of the same size and placed up and down, with 250 mm diameter and 350 mm width. During the working process, the distance between two rollers is 0.3 mm, the upper roller moves counterclockwise and the two rollers move in opposite directions with 0.2 m/s roll surface speed, crushing material with 0.6 mm particle size is obtained.

(2) Vibration sorting: the material obtained by rolling and crushing in step (1) is vibrated and sieved to obtain copper-containing metal flakes and non-metallic particles.

(3) Ultrafine pulverization and electro-separation: mix non-metallic particles obtained in step (2) with the epoxy resin powder cracking residue in a mass ratio of 4:1, and an ultrafine pulverizer is used to pulverize the particle size to 0.1 mm. Then electro-separation is used to obtain non-metal powder and metal powder, the metal powder is mixed with the metal flakes obtained in step (2) enters the metal recovery system.

(4) Quantitative batching: non-metallic powder obtained in step (3) is mixed with the common sawdust of birch wood for papermaking, sodium chloride, and water uniformly to obtain a mixed material. Sawdust is convenient for the volatilization of CO gas in sintering process, sodium chloride is convenient for the chlorination of volatile impurities of aluminum, iron and copper, among them, the sawdust of birch wood for general papermaking accounted for 3% of the total mass of mixed materials, sodium chloride accounted for 4% and water accounted for 1.5% of the total mass of mixed materials.

(5) Microwave sintering: put the mixed material obtained in step (4) into an alumina crucible for microwave heating, after a certain period of time, cool the griddle to obtain coarse silicon carbide, and the CO gas generated in the reaction process is returned to the water gas preparation process, wherein the temperature is raised to 1500° C. within 40 min, and insulated for 70 min.

The SiC content in the obtained crude silicon carbide is 92%.

Embodiment 4

(1) Rolling and crushing: Roll the waste circuit board cracking residue with a particle size of 5 cm. The two smooth pressure rollers used in the roller press are of the same size and placed up and down, with 275 mm diameter and 375 mm width. During the working process, the distance between two rollers is 0.6 mm, the upper roller moves counterclockwise and the two rollers move in opposite directions with 0.4 m/s roll surface speed, crushing material with 0.8 mm particle size is obtained.

(2) Vibration sorting: the material obtained by rolling and crushing in step (1) is vibrated and sieved to obtain copper-containing metal flakes and non-metallic particles.

(3) Ultrafine pulverization and electro-separation: mix non-metallic particles obtained in step (2) with the epoxy resin powder cracking residue in a mass ratio of 1:1, and an ultrafine pulverizer is used to pulverize the particle size to 0.15 mm. Then electro-separation is used to obtain non-metal powder and metal powder, the metal powder is mixed with the metal flakes obtained in step (2) enters the metal recovery system.

(4) Quantitative batching: non-metallic powder obtained in step (3) is mixed with the common sawdust of poplar wood for papermaking, sodium chloride, and water uniformly to obtain a mixed material. Sawdust is convenient for the volatilization of CO gas in sintering process, sodium chloride is convenient for the chlorination of volatile impurities of aluminum, iron and copper, among them, the sawdust of poplar wood for general papermaking accounted for 3.5% of the total mass of mixed materials, sodium chloride accounted for 5% and water accounted for 2% of the total mass of mixed materials.

(5) Microwave sintering: put the mixed material obtained in step (4) into an alumina crucible for microwave heating, after a certain period of time, cool the griddle to obtain coarse silicon carbide, and the CO gas generated in the reaction process is returned to the water gas preparation process, wherein the temperature is raised to 1600° C. within 80 min, and insulated for 75 min.

The SiC content in the obtained crude silicon carbide is 94%.

Embodiment 5

(1) Rolling and crushing: Roll the waste circuit board cracking residue with a particle size of 3.5 cm. The two smooth pressure rollers used in the roller press are of the same size and placed up and down, with 265 mm diameter and 450 mm width. During the working process, the distance between two rollers is 0.4 mm, the upper roller moves counterclockwise and the two rollers move in opposite directions with 0.2 m/s roll surface speed, crushing material with 0.6 mm particle size is obtained.

(2) Vibration sorting: the material obtained by rolling and crushing in step (1) is vibrated and sieved to obtain copper-containing metal flakes and non-metallic particles.

(3) Ultrafine pulverization and electro-separation: mix non-metallic particles obtained in step (2) with the epoxy resin powder cracking residue in a mass ratio of 5:1, and an ultrafine pulverizer is used to pulverize the particle size to 0.1 mm. Then electro-separation is used to obtain non-metal powder and metal powder, the metal powder is mixed with the metal flakes obtained in step (2) enters the metal recovery system.

(4) Quantitative batching: non-metallic powder obtained in step (3) is mixed with the common sawdust of elm wood for papermaking, sodium chloride, and water uniformly to obtain a mixed material. Sawdust is convenient for the volatilization of CO gas in sintering process, sodium chloride is convenient for the chlorination of volatile impurities of aluminum, iron and copper, among them, the sawdust of elm wood for general papermaking accounted for 4.5% of the total mass of mixed materials, sodium chloride accounted for 3.5% and water accounted for 1.5% of the total mass of mixed materials.

(5) Microwave sintering: put the mixed material obtained in step (4) into an alumina crucible for microwave heating, after a certain period of time, cool the griddle to obtain coarse silicon carbide, and the CO gas generated in the reaction process is returned to the water gas preparation process, wherein the temperature is raised to 1450° C. within 65 min, and insulated for 45 min.

The SiC content in the obtained crude silicon carbide is 92%.

Embodiment 6

(1) Rolling and crushing: Roll the waste circuit board cracking residue with a particle size of 3.8 cm. The two smooth pressure rollers used in the roller press are of the same size and placed up and down, with 280 mm diameter and 455 mm width. During the working process, the distance between two rollers is 0.3 mm, the upper roller moves counterclockwise and the two rollers move in opposite directions with 0.4 m/s roll surface speed, crushing material with 0.5 mm particle size is obtained.

(2) Vibration sorting: the material obtained by rolling and crushing in step (1) is vibrated and sieved to obtain copper-containing metal flakes and non-metallic particles.

(3) Ultrafine pulverization and electro-separation: mix non-metallic particles obtained in step (2) with the epoxy resin powder cracking residue in a mass ratio of 4:1, and an ultrafine pulverizer is used to pulverize the particle size to 0.15 mm. Then electro-separation is used to obtain non-metal powder and metal powder, the metal powder is mixed with the metal flakes obtained in step (2) enters the metal recovery system.

(4) Quantitative batching: non-metallic powder obtained in step (3) is mixed with the common sawdust of birch wood for papermaking, sodium chloride, and water uniformly to obtain a mixed material. Sawdust is convenient for the volatilization of CO gas in sintering process, sodium chloride is convenient for the chlorination of volatile impurities of aluminum, iron and copper, among them, the sawdust of birch wood for general papermaking accounted for 4.2% of the total mass of mixed materials, sodium chloride accounted for 3.3% and water accounted for 1.1% of the total mass of mixed materials.

(5) Microwave sintering: put the mixed material obtained in step (4) into an alumina crucible for microwave heating, after a certain period of time, cool the griddle to obtain coarse silicon carbide, and the CO gas generated in the reaction process is returned to the water gas preparation process, wherein the temperature is raised to 1460° C. within 70 min, and insulated for 50 min.

The SiC content in the obtained crude silicon carbide is 91.5%.

The above examples are only used to illustrate the preferred embodiments of the present invention, but the present invention is not limited to the above-mentioned embodiments. Within the scope of knowledge possessed by the technical personnel in the field and without violating the science and the thought of the invention, any modification made in the spirit and principle of the invention, equivalent to substitution and improvement, etc. shall be regarded as the protection scope of this application.

We claim:

1. A method for producing silicon carbide from waste circuit board cracking residue, comprising the following steps:

(1) rolling and crushing: roll the waste circuit board cracking residue with a particle size of 3-5 cm to obtain crushed materials with a particle size of 0.5-1 mm; two smooth pressure rollers used in the roller press are of the same size and placed up and down, with 200-300 mm diameter and 300-500 mm width; during the working process, a distance between the two rollers is 0.2-0.8 mm, the upper roller moves counterclockwise and the two rollers move in opposite directions with 0.1-0.5 m/s roll surface speed;

(2) vibration sorting: the material obtained by rolling and crushing in step (1) is vibrated and sieved to obtain copper-containing metal flakes and non-metallic particles;

(3) ultrafine pulverization and electro-separation: mix non-metallic particles obtained in step (2) with the epoxy resin powder cracking residue in a mass ratio of 5:1-1:1, and an ultrafine pulverizer is used to pulverize the particle size to 0.05-0.2 mm; then electro-separation is used to obtain non-metal powder and metal powder;

(4) quantitative batching: non-metallic powder obtained in step (3) is mixed with common hardwood sawdust for papermaking, sodium chloride, and water uniformly to obtain a mixed material; among them, the hardwood sawdust for general papermaking accounted for 2%-5% of the total mass of the mixed material, sodium chloride accounted for 3%-6% and water accounted for 1%-2% of the total mass of the mixed material;

(5) microwave sintering: put the mixed material obtained in step (4) into an alumina crucible for microwave heating, temperature is raised to 1300-1800° C. within 60-90 min, and insulated for 30-90 min, cool a griddle to obtain coarse silicon carbide.

2. A method for producing silicon carbide from waste circuit board cracking residue according to claim 1, characterized in that: the metal powder is mixed with the metal flakes obtained in step (2) enters a metal recovery system.

3. A method for producing silicon carbide from waste circuit board cracking residue according to claim 1, characterized in that: the hardwood sawdust for general papermaking refers to one or more of elm, birch and poplar.

4. A method for producing silicon carbide from waste circuit board cracking residue according to claim 1, characterized in that: CO gas generated in the reaction process is returned to the water gas preparation process.

* * * * *